United States Patent [19]

Metz et al.

[11] 4,123,247
[45] Oct. 31, 1978

[54] APPARATUS FOR EXPANDING METALLURGICAL SLAG

[75] Inventors: Paul Metz, Luxembourg; Robert Schockmel, Esch, Alzette; Roland Mersch, Dudelange, all of Luxembourg

[73] Assignee: Acieries Reunies de Burbach-Eich-Dudelange S.A. ARBED, Luxembourg, Luxembourg

[21] Appl. No.: 851,636

[22] Filed: Nov. 15, 1977

[30] Foreign Application Priority Data

Nov. 17, 1976 [LU] Luxembourg .......................... 76218
Sep. 26, 1977 [LU] Luxembourg .......................... 78186

[51] Int. Cl.² ............................................. C03B 19/08
[52] U.S. Cl. ........................................ 65/141; 65/20; 75/24; 264/11
[58] Field of Search ..................... 65/19, 20, 141, 2; 75/24; 264/11

[56] References Cited

U.S. PATENT DOCUMENTS 1,959,328  5/1934  Bartholomew ........................... 65/20
2,590,901  4/1952  Stout et al. .............................. 65/20
3,484,222  12/1969  Porter ........................................ 65/2

FOREIGN PATENT DOCUMENTS 457,707   1936  United Kingdom ........................ 65/20
562,039   6/1944  United Kingdom ...................... 65/141

Primary Examiner—Robert L. Lindsay, Jr.
Attorney, Agent, or Firm—Karl F. Ross

[57] ABSTRACT

Molten metallurgical slags are expanded by contact with water in a liquid or vapor state by passing the molten slag along a prefoaming or expanding trough by delivering the slag to this trough via an intermediate trough which is shiftable along the prefoaming trough in order to vary the location at which the slag contacts the prefoaming trough and the expanding-agent film thereon in accordance with physical characteristics of the molten slag, especially its temperature and viscosity. From the pre-expanding or prefoaming trough, the partially expanded slag may be subjected to expansion by conventional means, e.g. a rotating drum which disperses the slag particles through the air so that they can be collected in a completely expanded, dry and solidified state.

12 Claims, 4 Drawing Figures

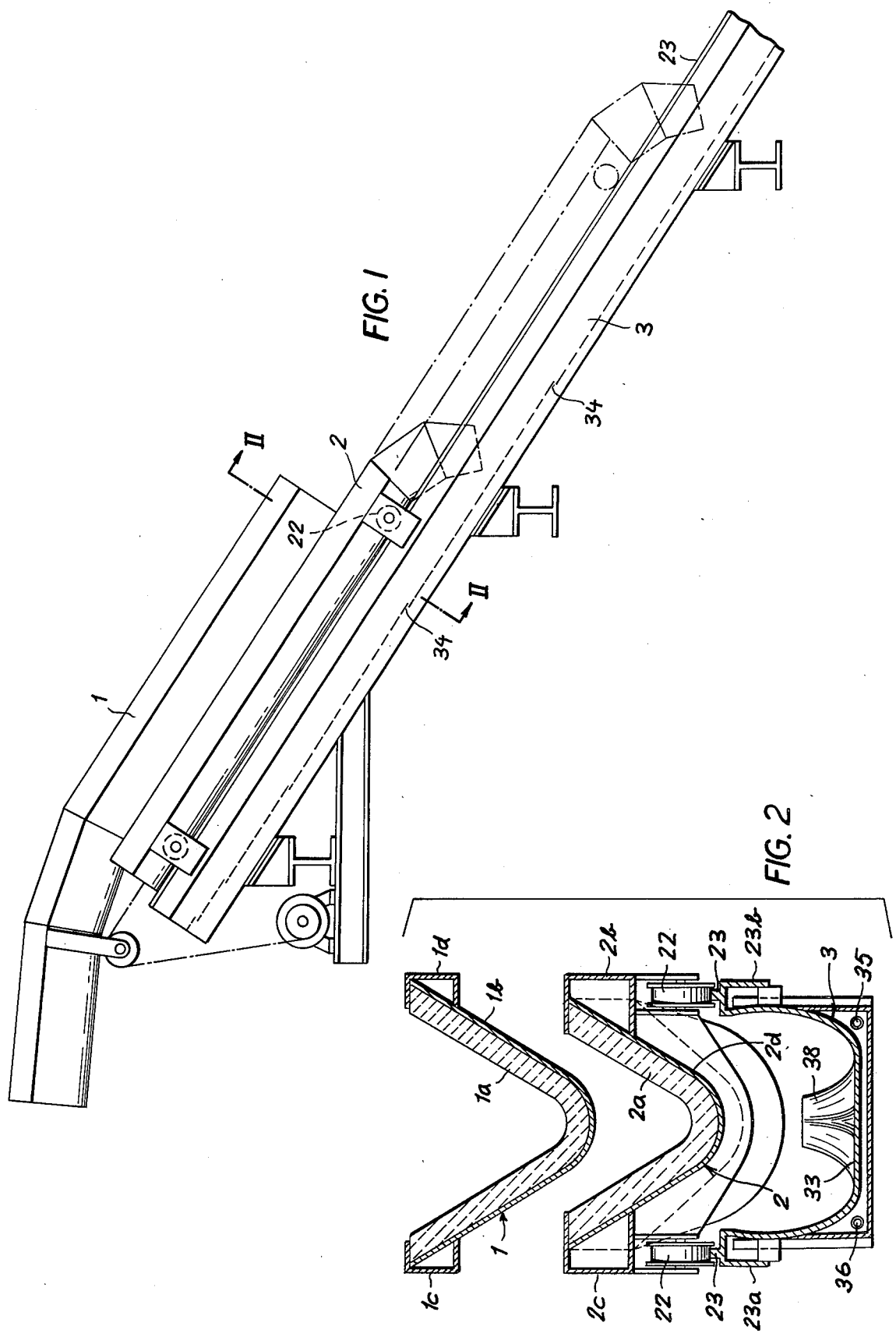

APPARATUS FOR EXPANDING METALLURGICAL SLAG

FIELD OF THE INVENTION

The present invention relates to a method of and to an apparatus for foaming or expansion of molten slags, especially blast furnace slags consisting of Thomas or Bessemer pig iron slags.

BACKGROUND OF THE INVENTION

For the foaming or expansion of molten metallurgical slags, it has been considered necessary heretofore to contact the molten slag with a quantity of water such that the expansion takes place in the proper relationship between the molten slag and the water to obtain complete and uniform expansion of the slag.

To this end, various apparatus has been proposed heretofore. For example, the slag may be expanded in foaming chutes or troughs in which the slag is passed continuously from one end of the chute to the opposite end thereof and is continuously contacted with a water film which is provided on the floor of the chute. This brings about the desired contact of the molten slag with the water to effect at least partial foaming of the slag.

It has also been proposed to foam the slag by contacting the molten slag with water upon rotating bodies which can be formed with plates or vanes and which centrifugally disperse the molten slag as it contacts the water phase.

In yet another system, the slag is subdivided and thereupon brought into contact in the form of small liquid particles, with the water phase. In the latter case, the slag particles are projected through the air, so that they come into contact with both water droplets and steam and thereby both expand and solidify.

Such systems, which have been found to be effective in the foaming and expansion of molten slags delivered at relatively low rates over given time periods from a metallurgical furnace or a ladle, have a significant technological disadvantage in that they are incapable of modification in the foaming parameters, namely, the duration of the prefoaming phase, in accordance with the slag characteristics. In fact, it is scarcely possible with these systems even to control the quantity of water and the duration of contact of the water with the molten slag in accordance with the physical characteristics of the latter.

Since satisfactory and reproducible results require that the slag contact the water for a duration and in an amount which is related to the physical characteristics of the molten slag, it has been necessary heretofore to maintain the physical characteristics of the slag within a narrow range. The physical characteristics of the slag which are most significant in this regard are the temperature and the viscosity.

Difficulties have been encountered, therefore, when the molten slag is at a different temperature or viscosity from that for which the foaming or expansion system was designed.

Technologically, therefore, it was necessary to attempt, by controlling the metallurgical process which generated the slag, to maintain the temperature and viscosity thereof substantially constant.

This could not be achieved with many blast furnace operations, however, in the preparation of Thomas or Bessemer pig iron, because an optimum generation of the primary product, namely, the pig iron, often gave rise to slags with varying physical characteristics.

For instance, it is known that hot slags, as long as they do not contain excessive quantities of lime, are readily foamable. Hematite pig iron slags also have, in general, good foamability or expandability, as do Thomas pig iron slags having temperatures in excess of 1475° C. However, with lower temperatures, the foamability of Thomas pig iron slags declines sharply.

When it is desired to work up slags of poor foamability to so-called blast furnace "pumice", it is found that the foamed or expanded product can contain as much as 60–70% by weight or volume of slag sand, i.e. a predominantly unfoamed product which has less value and desirability than the blast furnace pumice. As a consequence, it is necessary to separate the slag sand from the pumice component.

OBJECTS OF THE INVENTION

It is the principal object of the present invention to provide a method of foaming or expanding metallurgical slags which is highly reproducible and capable of minimizing the slag sand component even when the physical characteristics, especially temperature and viscosity, of the molten slag can vary.

Yet another object of the invention is to provide an improved apparatus for the foaming of metallurgical slags whereby the disadvantages of earlier systems can be obviated.

It is also an object of this invention to provide a method of and an apparatus for the foaming of molten slags, especially slags which may from time to time have temperatures at which they are considered less than readily foamable, which can produce a foamed or expanded product of high quality and uniformity.

Still another object of this invention is to provide a method of controlling a slag-expansion or foaming process to permit the modification of the foaming process in accordance with the physical characteristics of the slag.

SUMMARY OF THE INVENTION

These objects and others which will become more apparent hereinafter are attained, in accordance with the present invention, by regulating the duration of a prefoaming operation to which the molten slag is subjected in accordance with the temperature and viscosity of the molten slag.

This is accomplished, in accordance with the present invention, by carrying out the prefoaming along a predetermined path along which the molten slag is contacted with a foaming agent or medium, usually liquid water or steam, and by introducing the molten slag to this path at locations which can vary in accordance with the physical characteristics mentioned above so that, for lower temperature or more poorly foaming slags, the molten slag remains upon this path for a greater time span. In other words, the present invention increases the length of the prefoaming path in accordance with the temperature and viscosity of the slag to increase this length for lower temperatures and higher viscosities.

Consequently, the prefoaming operation can be increased to a maximum by introducing low-temperature or poor-foaming, high-viscosity slags to the prefoaming path at a location further upstream therealong than is the case with higher-temperature, lower-viscosity or better-foaming slags. The prefoaming operation can be carried out to a maximum or minimum extent, as required, by cascading the molten slag onto a trough constituting the prefoaming path at a maximum upstream location or at a location relatively downstream thereof.

It has been found that this approach permits the prefoaming operation to maintain the physical characteristics of the prefoamed slag at the discharge end of this trough practically constant in spite of varying physical characteristics of the molten slag deposited upon the latter so that the subsequent final expansion or foaming operation can be effected on a product which has practically constant characteristics so that the end product is, of course, highly uniform and reproducible.

By carrying out a longer prefoaming operation on the poor-foaming slags than is the case with better-foaming slags, the prefoamed product obtained in both cases is practically the same, the final foamed slag has an extremely low content of so-called slag sand and, naturally, the degree of foaming can be maintained uniform.

The process of the present invention is particularly suitable for processing the slags of modern blast furnaces since particular concern over the temperature and viscosity of the slag need no longer result in modification of the metallurgical process carried out therein.

In addition, the quantities of slag generated by modern blast furnaces can be handled readily if the downstream portion of the prefoaming trough is provided so as to subdivide the slag during or after the prefoaming into at least two partial streams. It has been found to be advantageous to deliver these partial streams separately to a common inclined distributor plate in which the streams merge again but spread over a wider region and contact a centrifugal foaming device over a wide axial length of the latter. In other words, the two streams are united into a broad and relatively thin stream which is cascaded onto a slag-foaming drum of the centrifugal type. A drum of this type can have an axial length, corresponding to the width of the inclined plate from which the prefoamed material cascades, of greater than 2m. Such an arrangement permits more than two tons of slag per minute to be processed.

The apparatus for carrying out the method of the present invention can utilize a conventional foaming system merely by adding to the prefoaming trough, an intermediate trough which is shiftable therealong and deposits the slag at a selected location along the prefoaming path. Alternatively, parts of the conventional apparatus can be replaced by the prefoaming trough, intermediate trough and fixed chute for delivering the molten slag to the intermediate trough, as will be described in greater detail hereinafter.

The apparatus of the present invention thus generally comprises a prefoaming trough which is inclined downwardly and has a discharge end which can feed a centrifugal foaming drum which carries out the final expanding operation. The length of this prefoaming trough should correspond to the maximum path length required for prefoaming even the poorest quality slag to be handled. Above and parallel to this prefoaming trough, there is provided an intermediate trough which can be shifted relative to the prefoaming trough to displace the discharge edge of the intermediate trough along the path to vary the location at which the slag is delivered to the prefoaming trough and hence the length of the prefoaming path therealong. Above this intermediate trough there is fixedly located a further trough or chute by means of which the slag is delivered to the intermediate trough. The intermediate trough, therefore, should have a length corresponding to the difference between the maximum and minimum positions for delivery of the slag to the prefoaming trough.

The bottom of the prefoaming trough is provided with openings, i.e. transversely extending slots, through which water is supplied to the prefoaming trough to form the water film thereon.

The length of the intermediate trough may correspond to the length of the prefoaming trough or can be shorter than the latter. In the case in which the intermediate trough has a length equal to that of the prefoaming trough, it is possible to deposit a molten slag with a minimum of prefoaming or with none at all onto the centrifugal foaming drum. More generally, however, the length of the intermediate trough will be less than that of the prefoaming trough so that at least some degree of pre-expansion is carried out before the slag contacts the final foaming device.

Movement of the intermediate trough can be carried out during the foaming operation or prior to the commencement thereof for a particular slag charge.

While the inlet end of the prefoaming trough preferably consists of a simple semicircular or oval-section trough, the outlet portion thereof preferably is subdivided into two branches which cooperate with a spreading chute to spread the prefoamed product over the full length of the centrifuge drum. The prefoaming trough can have a constant width over its entire length or, toward its discharge end, can be spread or widened toward the latter chute, preferably at an angle of 15° to 30° from the main trough axis.

It has been found to be advantageous to form the prefoaming trough in segmented form so that the individual segments, in the direction of slag flow, overlap one another or are progressively lower in a cascade arrangement. The coolant, i.e. water, can be introduced between adjacent segments.

According to a further feature of the invention, each of the segments is cooled internally with water. In this case, the segments can be constituted out of a casting in which the cooling coils are disposed or double-wall sheet-steel boxes with water inlets and outlets.

A water cooling system can be provided for the entire pre-expanding trough or for each individual trough segment. The inlet and intermediate troughs are preferably lined only with refractory material, e.g. tamped refractory.

It has been found to be advantageous to use, instead of fresh cold water, the heated cooling water obtained from the slag treatment for the further foaming of the slag. The heated cooling water can be introduced between the individual segments, can be used for wetting the distributor plate or chute at the end of the prefoaming trough, or can be employed to foam the slag on the drum. The water can be at least partially replaced by steam if desired.

The distributor plate chute, of which at least one is provided, can also be formed with an inset cooling coil as a cast plate.

The most significant advantage of the present invention resides in that it permits optimum and reproducible foaming of the slag independent of the starting temperature, viscosity and quantity thereof. The operating conditions of the finish-foaming unit can be maintained substantially constant for all types of slag charges. The coarse control of the treatment is effected in the prefoaming trough during the foaming operation or prior thereto by shifting the intermediate trough. The positions of the intermediate trough can be easily determined empirically for all slag conditions likely to be encountered.

BRIEF DESCRIPTION OF THE DRAWING

The above and other objects, features and advantages of the present invention will become more readily apparent from the following description, reference being made to the accompanying drawing in which:

FIG. 1 is a side-elevational view through a portion of the apparatus of the present invention;

FIG. 2 is a transverse cross section through the troughs of the present invention, taken along line II—II of FIG. 1;

SPECIFIC DESCRIPTION

Figure 3:
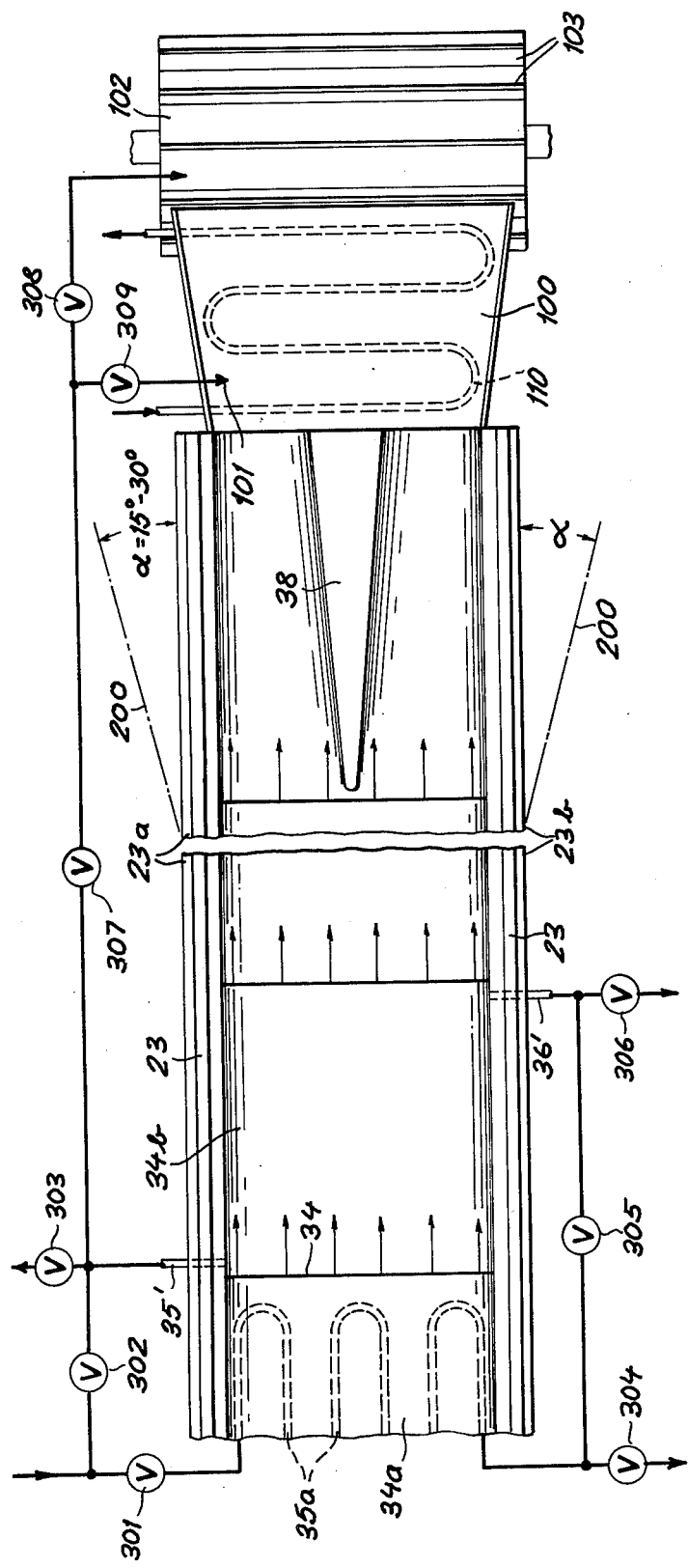
FIG. 3 is a plan view of a portion of the apparatus with the intermediate and inlet troughs removed.

The apparatus basically comprises a fixed inlet trough 1 which serves to deliver the molten slag stream to the apparatus and can be provided so as to maintain a constant flow rate. The trough 1 comprises a tamped refractory lining 1a formed on a sheet-steel-shell 1b and is reinforced by channels 1c and 1d at its upper edge. The trough 1, which has a generally upwardly open U configuration or profile constant along its length, delivers the molten slag to an intermediate trough 2 which likewise has an upwardly open generally U configuration with a rounded bottom. The intermediate trough 2 is likewise formed with a tamped refractory lining 2a, a pair of reinforcing channels 2b and 2c, and a sheet-steel sheel 2d.

The intermediate trough 2 is shiftable between, for example, the solid line and dot-dash line positions shown in FIG. 1, along the prefoaming or pre-expanding trough 3. As a result, the length of the prefoaming path can be increased or reduced in accordance with the physical characteristics of the slag.

The intermediate trough 2 is provided with wheels 22 which ride upon rails 23 formed upon the reinforcing longitudinal channels 23a and 23b of the prefoaming trough 3.

The prefoaming trough 3 extends essentially parallel to the intermediate trough 2 and is downwardly inclined. The refractory iron or steel trough bottom 33 of the prefoaming trough is formed from spaced-apart segments admitting the refrigerant through the slots 34 between the segments. The individual segments can be cooled by forming them as hollows provided with inlet pipes 35 and outlet pipes 36 for the coolant.

The admission of the water through the slots 34 between the cascaded bottoms of the adjacent segments causes the slag delivered by the intermediate trough 2 to contact a water film and, in accordance with conventional teachings, to be expanded.

The discharge end of the trough can be widened outwardly, e.g. at an angle of 15° to 30° as represented at $\alpha$ in FIG. 3 to the dot-dash positions of the sides of the trough shown. In the uniform-width arrangement illustrated in solid lines in FIG. 3 or the widened discharge end orientation represented by the dot-dash lines, the discharge end can be provided with a flow splitter 38 which subdivides the slag stream into two partial streams.

Below the prefoaming trough 3, as has also been shown in FIGS. 3 and 4, there is provided a conventional foaming device which carries out the finish-foaming and expansion of the plastic mass to solidification of the latter.

The finish-foaming apparatus can include a drum 102 having blades 103 parallel to the drum axis and of a diameter of 0.6 to 1.2 m and an axial length of 1.50 to 2.50 m. The slag stream is collected and distributed uniformly over the drum by a distributor plate 100 in the form of a chute which delivers the particles together with water to the drum. The rotation of the drum 102, as shown in FIG. 4, scatters the particles as it projects them in streams 104 through the air, causing the particles, upon solidification, to become rounded, completely foamed and dry. The solidified dry particles are collected in a bin 105.

When the apparatus described above is used, with the intermediate trough of the invention, it is possible to expand a slag obtained from a blast furnace producing pumice pig iron at a temperature of 1450° C. to produce so-called blast furnace pumice with a substantially constant flow of water equivalent to about 1 $m^3$/ton of slag. Without the intermediate trough adjusted for optimum results, about 60–70% of the product is slag sand. With the claimed invention, the particle size of the expanded product between 0 and 3 mm is over 50% and the slag sand content is less than 20%.

Figure 4:
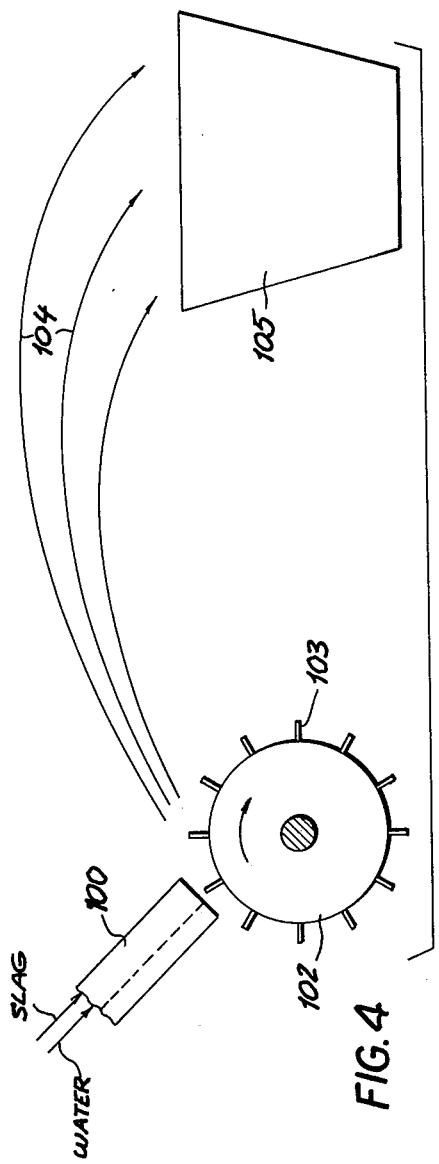
FIG. 4 is a diagrammatic illustration of the finish-foaming portion of the apparatus of the invention.

As will also be apparent from FIGS. 3 and 4, water may be delivered at 101 to wet the distributor chute 100 which may be a cast-metal plate provided with a cooling coil 110 as shown in broken lines in FIG. 3. The water used for expanding the slag may be heated water obtained from a cooling coil 35a in one of the segments 34a or from the box-like cooling arrangement of an adjacent segment 34b. To this end, the cooling water can be introduced via valves 301 and 302 in parallel to the adjacent segments and delivered to an outlet via valves 304 and 305 or 306, or via valve 303 and valve 307 to the valves 308 and 309 controlling the delivery of water to the chute 100 and the drum 102 for the final foaming. The valve arrangement also permits the cooling of the adjacent segments to be carried out in series. In this case, valve 302 is closed and valves 301 and 305 are open. Valve 304 is closed and valve 303 is open. In this case the water will flow through the cooling coil 35a and then through the interior of the segment 34b in series.

We claim:

1. An apparatus for expanding a molten slag which comprises:

a fixed inlet trough inclined downwardly and having a discharge edge;

a movable intermediate trough disposed below said discharge edge and shiftable relative to said inlet trough;

a fixed prefoaming trough disposed below said intermediate trough and parallel thereto, said intermediate trough having a discharge side shiftable relative to said prefoaming trough to vary the point therealong at which molten slag is delivered to said prefoaming trough, said prefoaming rough being provided with means for contacting molten slag along a path extending along said prefoaming trough and of a length corresponding to the point at which said molten slag is delivered thereto, with a water film; and further means downstream of said prefoaming trough for further expanding the slag pre-expanded on said prefoaming trough.

2. The apparatus defined in claim 1 wherein said prefoaming trough has a discharge end widening at an angle of 15° to 30° toward said further means.

3. The apparatus defined in claim 1 wherein said prefoaming trough has a discharge and provided with a foam splitter for subdividing pre-expanding slag on said prefoaming trough into two partial streams.

4. The apparatus defined in claim 1 wherein said prefoaming trough is provided with a plurality of segments disposed in cascade, means being provided for introducing water between said segments onto the floor of said prefoaming trough.

5. The apparatus defined in claim 1 wherein said prefoaming trough has a length at least equal to the length of said intermediate trough.

6. The apparatus defined in claim 5 wherein said prefoaming trough is formed from a plurality of segments each constituted as a casting having a cooling coil inset therein.

7. The apparatus defined in claim 1 wherein said prefoaming trough is constituted of segments having double walls and supplied with water inlets and outlets.

8. The apparatus defined in claim 1 wherein said prefoaming trough is constituted of a plurality of segments each having a respective cooling water circulation.

9. The apparatus defined in claim 1 wherein said prefoaming trough is provided with a plurality of segments each having a cooling water circulation, the cooling water circulations being connected in series for said segments.

10. The apparatus defined in claim 1, further comprising means for feeding heated water from said prefoaming trough into contact with the molten slag to expand the latter.

11. The apparatus defined in claim 1 wherein said prefoaming trough is cooled by steam.

12. The apparatus defined in claim 1 wherein said further means includes a distributor plate downstream of said prefoaming trough and a centrifuge drum below said plate for dispersing particles of the expanded slag and finally expanding and cooling same.

* * * * *